United States Patent [19]

Schoenmakers

[11] 4,152,735

[45] May 1, 1979

[54] TAPE TRANSPORT ARRANGEMENT FOR TENSIONING AND TRANSPORTING A MAGNETIC TAPE

[75] Inventor: Johannes J. M. Schoenmakers, Eindhoven, Netherlands

[73] Assignee: U.S. Philips Corporation, New York, N.Y.

[21] Appl. No.: 765,542

[22] Filed: Feb. 4, 1977

[30] Foreign Application Priority Data

Mar. 24, 1976 [NL] Netherlands .......................... 7603055

[51] Int. Cl.$^2$ ..................... G11B 15/28; G11B 23/04; G11B 15/43

[52] U.S. Cl. ...................................... 360/71; 242/199; 360/96.3; 360/73; 360/74.3

[58] Field of Search ....................... 360/71, 72, 74, 96, 360/93, 94; 242/197–202, 206–207, 75.1, 75.5

[56] References Cited

U.S. PATENT DOCUMENTS

| | | | |
|---|---|---|---|
| 3,257,515 | 6/1966 | Nakamatsu | 360/74 |
| 3,286,943 | 11/1966 | Morimoto | 360/74 |
| 3,409,239 | 11/1968 | Siebert | 360/74 |
| 3,419,686 | 12/1968 | Rhoades | 360/74 |
| 3,659,806 | 5/1972 | Crafts | 360/96 |
| 3,695,552 | 10/1972 | Guyton | 360/96 |
| 3,870,248 | 3/1975 | Nara et al. | 360/74 |
| 4,000,514 | 12/1976 | Fukatsu | 360/96 |
| 4,017,896 | 4/1977 | Takemoto | 360/74 |

Primary Examiner—Alfred H. Eddleman
Attorney, Agent, or Firm—David R. Treacy

[57] ABSTRACT

A tape transport mechanism for tensioning a magnetic tape unwound from a first reel past one or more magnetic heads and wound onto a second reel. The tape transport has a rotatable capstan upstream from the magnetic heads and a capstan pressure roller which cooperates with the capstan, and a transport spindle downstream from the magnetic heads with an associated transport spindle pressure roller. The transport spindle is driven by a constant torque drive to stretch the tape between the capstan and the transport spindle over the magnetic heads.

3 Claims, 3 Drawing Figures

TAPE TRANSPORT ARRANGEMENT FOR TENSIONING AND TRANSPORTING A MAGNETIC TAPE

BACKGROUND OF THE INVENTION

1. Field of the Invention

The invention relates to a tape-transport arrangement for tensioning and transporting a magnetic tape which is unwound from a first reel, is subsequently transported past one or more magnetic heads for magnetically recording and/or reading signals, and finally wound onto a second reel and more particularly to a tape transport mechanism having first and second rotatable reel spindles for supporting and driving the first and the second reel respectively; a rotatable capstan, which is disposed upstream from the magnetic head(s) as defined by the direction of transport of the magnetic tape, for accurately determining the speed of the magnetic tape to be passed along the magnetic head(s); a capstan pressure roller for pressing the magnetic tape against the capstan; a transport spindle which is disposed downstream the magnetic head(s) for obtaining the desired tape tension in the part of the magnetic tape which is disposed between the capstan and the transport spindle and which passes the magnetic head(s); a transport-spindle pressure roller for pressing the magnetic tape against the transport spindle, and electrical drive means for rotating at least the second reel spindle, the capstan and the transport spindle.

The problems associated with the conventional method of tape transport in magnetic tape equipment will be discussed briefly, after which the state-of-the-art with respect to the tape transport arrangements mentioned above will be discussed.

In conventional tape transport arrangements which are frequently employed because of their simplicity a capstan is used which is disposed downstream the magnetic heads, according to the direction of transport of the magnetic tape. The magnetic tape is unwound from the first reel (or feed reel), passes the magnetic heads and then the capstan, and is finally wound onto the second reel (or take-up reel). The terms "feed reel" and "take-up reel" are always used with reference to the direction of transport of the magnetic tape. Thus, in the case of transport arrangements in which the direction of transport of the tape can be reversed, the two reels will change names upon reversal of the transport direction.

A problem associated with the conventional tape-transport arrangement is that the cumulative angle of tape contact transversed by the magnetic tape before it reaches the capstan is comparatively great, namely of the order of 80°. An angle of tape contact is to be understood to mean an angle over which a magnetic tape makes contact with a cylindrical body, viewed from the axis of said body. Between the feed reel and the capstan the magnetic tape, in the conventional tape transport arrangement, makes contact with several cylindrical bodies, such as guide rollers and pins as well as the magnetic heads. The cumulative angle of tape contact is to be understood to mean the sum of the angles of tape contact owing to the contact consecutively made with a number of cylindrical bodies by the magnetic tape during its transport.

The cumulative angle of tape contact is not only indicative of the friction to which the tape is subjected owing to its contact with the said cylindrical bodies, but it also influences the degree in which tape tension variations near the feed reel, as a result of irregularities when the tape is unwound, affect the tension of the magnetic tape at the location of the capstan. Because of the great cumulative angle of tape contact, tape tension variations near the feed reel will manifest themselves as tape tension variations which are a factor 1.5 to 1.7 greater at the location of the capstan.

Variations of the tension of the magnetic tape produce variations in stretch of the magnetic tape. These manifest themselves as variations in the speed with which the magnetic track which is recorded (or to be recorded) on the tape is moved past the magnetic heads. This results in an undesired variation of the frequency of the reproduced or recorded signal, which undesired variation is superimposed on this signal and is referred to as "wow and flutter".

The force exerted on the tape by the feed reel and the tape-up reel nearly always depends on the diameter of the reels, in particular in cassette equipment. In a magnetic tape cassette this force may vary by a factor of $2\frac{1}{4}$. As a result of this, the work to be performed by the capstan on the magnetic tape varies from negative for a full feed reel to positive for an empty feed reel. Consequently, when the take-up reel is still empty, the capstan first exerts a braking action on the magnetic tape, the braking action gradually decreasing as the take-up reel becomes fuller and at a given instant changing into a tractive action. This means that during playing of a magnetic tape the force exerted on the magnetic tape by the capstan varies substantially. The greatest braking force must be exerted at the beginning of the magnetic tape and the greatest tractive force at the end. As the force with which the pressure roller cooperates with the capstan is subject to practical limits, irregular slippage may result between the capstan and the magnetic tape both at the beginning and at the end of the tape transport. These variations in the speed of transport of the tape along the capstand also manifest themselves as wow and flutter. The wow-and-flutter effects may accumulate in an overall effect which for good cassette recorders should not exceed approximately 0.2% of the desired constant speed.

A further drawback of conventional tape transport arrangements is the impossibility of tape transport in the reverse direction.

2. Description of the Prior Art

Tape transport arrangements of the type mentioned in the preamble mitigate some of these drawbacks. Such a tape transport arrangement is for example known from German Auslegeschrift 1,474,273 to which U.S. Pat. No. 3,409,239 corresponds. An important feature of this arrangement is the use of a "feeding" capstan, that is, a capstan which is situated upstream of the magnetic head or magnetic heads as determined by the direction of movement of the magnetic tape. This yields a substantial reduction of the cumulative angle of contact between the feed reel and the capstan, so that the slip at the capstan is reduced. If for the sake of simplicity it is assumed that the capstan is connected to a flywheel with infinite inertia, the magnetic tape after the capstan is, in principle entirely free of tension variations due to irregularities during unwinding of the feed reel, while variations in tape tension resulting from irrregularities during winding onto the take-up reel are now reduced by the prevailing cumulative angle of contact between the capstan and the take-up reel because the tape-tension variations in the downstream part of the tape are divided by a value greater than 1 instead of being multiplied thereby. The use of a transport spindle in the case of a "feeding" capstan is necessary in view of the possibility of looping of the magnetic tape near the magnetic heads, for example owing to a brief sticking or momentary slowing down or stopping of the take-up reel. By the use of a transport spindle the requirements imposed on the uniformity of winding of the take-up reel can be less stringent. Moreover, the transport spindle can be used for producing a tractile tension in the magnetic tape. Thus, the critical part of the magnetic tape, namely the part which is located near the magnetic heads, is virtually isolated with respect to variations in tape tension which might be introduced as a result of imperfections in winding as well as unwinding of the reels.

In the previously mentioned tape transport arrangement U.S. Pat. No. 3,409,239 the capstan and the transport spindle are both coupled to identical flywheels which are constituted by pulleys of equal dimensions. These pulleys are coupled by a common elastic belt to a drive spindle on which a drive pulley is mounted. The elastic belt is driven by the drive spindle in such a way that the belt (in the running direction of the magnetic tape) runs from the drive spindle to the capstan, then to the transport spindle and then back to the drive spindle. By the increasing stretch in the belt between the capstan and the transport spindle the flywheel of the transport spindle is driven slightly faster than the capstan flywheel, because the diameter of the belt is slightly reduced as a result of stretch. Owing to the slightly faster drive of the transport spindle the magnetic tape between the capstan and the transport spindle is tensioned. Because of the symmetrical arrangement this tape transport is suitable for both running directions.

The difference in speed between the capstan and the transport spindle is very small, of the order of 0.2%. As a result, if the capstan and the transport spindle each exhibit an oscillation of 0.002 mm and these oscillations are moreover in phase opposition, the tape tension in the part of the magnetic tape between the capstan and the transport spindle periodically varies from zero to a maximum, and in addition discontinues effects may occur. This may give rise to so-called "capstan wow" (approx. 7 Hz). This effect is likely to contribute some tenths of a thousandth to the overall wow and flutter in a cassette recorder.

Owing to the slight difference in speed between the transport spindle and the capstan and the occurrence of oscillations in the two spindles a sort of "starting effect" is produced when a tape recorder is switched on. The tape tension between the capstan and the transport spindle must, so to speak, be built up. This requires a few seconds. More sophisticated equipment with a tape transport arrangement of the type discussed herein may therefore incorporate an additional feature which ensures that recording or reproduction of the magnetic track on the tape, as the case may be, is started with a delay. However, this leads to great problems when two separate magnetic recordings should exzctly be joined exactly to each other.

SUMMARY OF THE INVENTION

It is an object of the invention to provide an improved tape transport arrangement reducing capstan wow and starting effects.

In a tape transport mechanism according to the invention the drive means cooperate with the transport spindle by means of a slip drive device which comprises a first drive section which is rigidly connected to the trasnport spindle and which is rotatable therewith, as well as a second drive section by means of which during operation of the tape transport arrangement a continuous driving torque is exerted on the first drive section which torque tends to cause the transport spindle to rotate with a higher number of revolutions than its number of revolutions in accordance with the transport speed of the magnetic tape.

In an embodiment in which a reversible tape transport is possible the capstan and the transport spindle may be constituted by two identical spindles, which are drivable by means of two identical electric motors, the one motor for driving the one spindle being connected to an electrical speed control circuit for maintaining the capstan speed accurately constant and the other motor for driving the other spindle being connected to an electronic tape tension circuit for applying such a supply current to the motor that the torque required for the tape tension is produced. To record or play back in reverse direction, the tape transport switching means are provided for switching the speed control circuit and the tape tension circuit from the one motor to the other motor. In this embodiment an electric motor is used as slip drive device. One of the advantages thus obtained is that the slipping coupling includes no frictionally cooperating mechanical parts which are subject to wear and which may give rise to variations of the torque exerted on the transport spindle. Furthermore, the use of an electric motor for the transport spindle results in an arrangement which can very simply be adapted to the required magnitude of the slipping torque. This torque is a function of the current applied to the relevant electric motor which can be changed and adjusted by simple well-known means.

In another embodiment which is also suitable for reversible tape transport the capstan and the transport spindle are constituted by two identical spindles, and the tape transport arrangement includes a first slipping coupling which co-operates with the one spindle and a second slipping coupling which co-operates with the other spindle; a first blocking coupling which cooperates with the one spindle and a second blocking coupling which cooperates with the other spindle; a transmission device for transmitting the rotation of a tape transport motor with different speeds to the said spindles, as well as a switching device for changing the direction of driving of the spindles and simultaneously switching over the difference in speed between the two spindles. In this embodiment slipping couplings are used which may have a low cost.

The invention will be described hereinafter in more detail with reference to the drawing which shows two embodiments.

DESCRIPTION OF THE PREFERRED EMBODIMENTS

Figure 1:
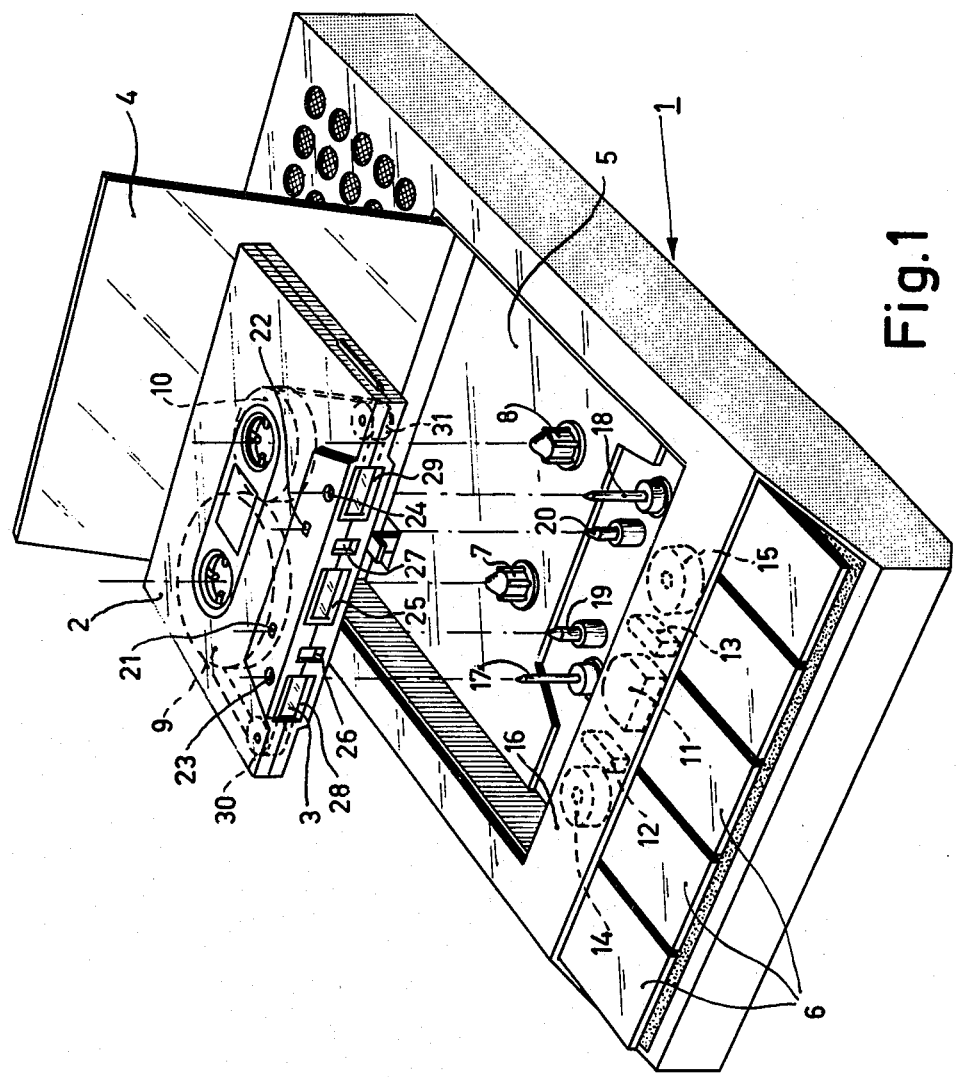
FIG. 1 is a perspective view of a cassette recorder with a magnetic tape cassette equipped with a tape transport arrangement in accordance with the invention, FIG. 2 schematically and in perspective shows an embodiment of a tape transport arrangement which is suitable for reversible operation and in which two electric motors are used.

Apart from the tape transport arrangement which is used, the cassette recorder of FIG. 1 is of a conventional type and comprises a housing 1, which accommodates the drive mechanism for a magnetic tape cassette 2, in general simply referred to as a cassette, as well as electronic circuits for reproducing and/or recording signals on the magnetic tape 3, a loudspeaker and, as the case may be, a microphone. The cassette recorder includes a cover 4 which can close the compartment 5 in which the cassette can be placed. At the front of the cassette recorder a number of keys 6 are pivotally mounted for controlling the various functions of the apparatus. In the compartment 5, which is generally referred to as cassette compartment, a first and a second reel spindle 7 and 8 are located. These spindles serve for respectively supporting and driving a first and a second reel 9 and 10 for the magnetic tape which is contained in the cassette 2. The cassette recorder is equipped with a recording/playback head 11, two erase heads 12 and 13, as well as two pressure rollers 14 and 15 respectively. These heads and pressure rollers are symbolically represented by dashed lines, because in the shown position of the component on which they are mounted they are concealed under a part 16 of the cassette recorder. The cassette recorder is both suitable for forward and reverse operation, that is recording on and/or reproducing from the magnetic tape 3 is possible both in the one and in the other direction of rotation of the reel spindles 7 and 8.

For tensioning and transporting the magnetic tape from reel 9 to reel 10 along the magnetic heads 11, 12, 13 use is made of a capstan 17 which is disposed upstream from the magnetic heads, which capstan serves for moving the magnetic tape along the magnetic heads with an accurately defined speed, and of a transport spindle 18, which is situated downstream from the magnetic heads, for obtaining the desired tape tension in the part where the magnetic tape passes along the said magnetic heads. These two spindles respectively cooperate with the capstan pressure roller 14 and the transport spindle pressure roller 15. During playback or recording transport of the magnetic tape from the reel 10 to the reel 9, in the reverse direction of movement, the spindle 18 functions as capstan and the capstan 19 as transport spindle. For the sake of convenience and in accordance with common practice, these two components will be referred to as two capstans hereinafter when a tape transport arrangement suitable for two directions of recording or playback movement is discussed.

For accurately positioning the cassette 2 in the cassette compartment 5 relative to the magnetic heads and the tape transport arrangement two positioning pins 19 and 20 are mounted on the bottom of the cassette compartment. These pins cooperate with corresponding openings in the top and bottom walls of the cassette 2. The openings in the top wall are designated 21 and 22. In a similar way the capstans 17 and 18 cooperate with openings in the top and bottom walls of the cassette. The relevant openings in the top wall are denoted by the reference numerals 23 and 24. In the front wall of the cassette openings are formed which cooperate with the magnetic heads and the pressure rollers. The opening 25 cooperates with the recording/playback head 11, the openings 26 and 27 with the erase heads 12 and 13, and the openings 28 and 29 with the two pressure rollers 14 and 15. Two tape guide rollers 30 and 31 in the cassette ensure that the magnetic tape is passed along the front of the cassette and the said openings.

Figure 2:
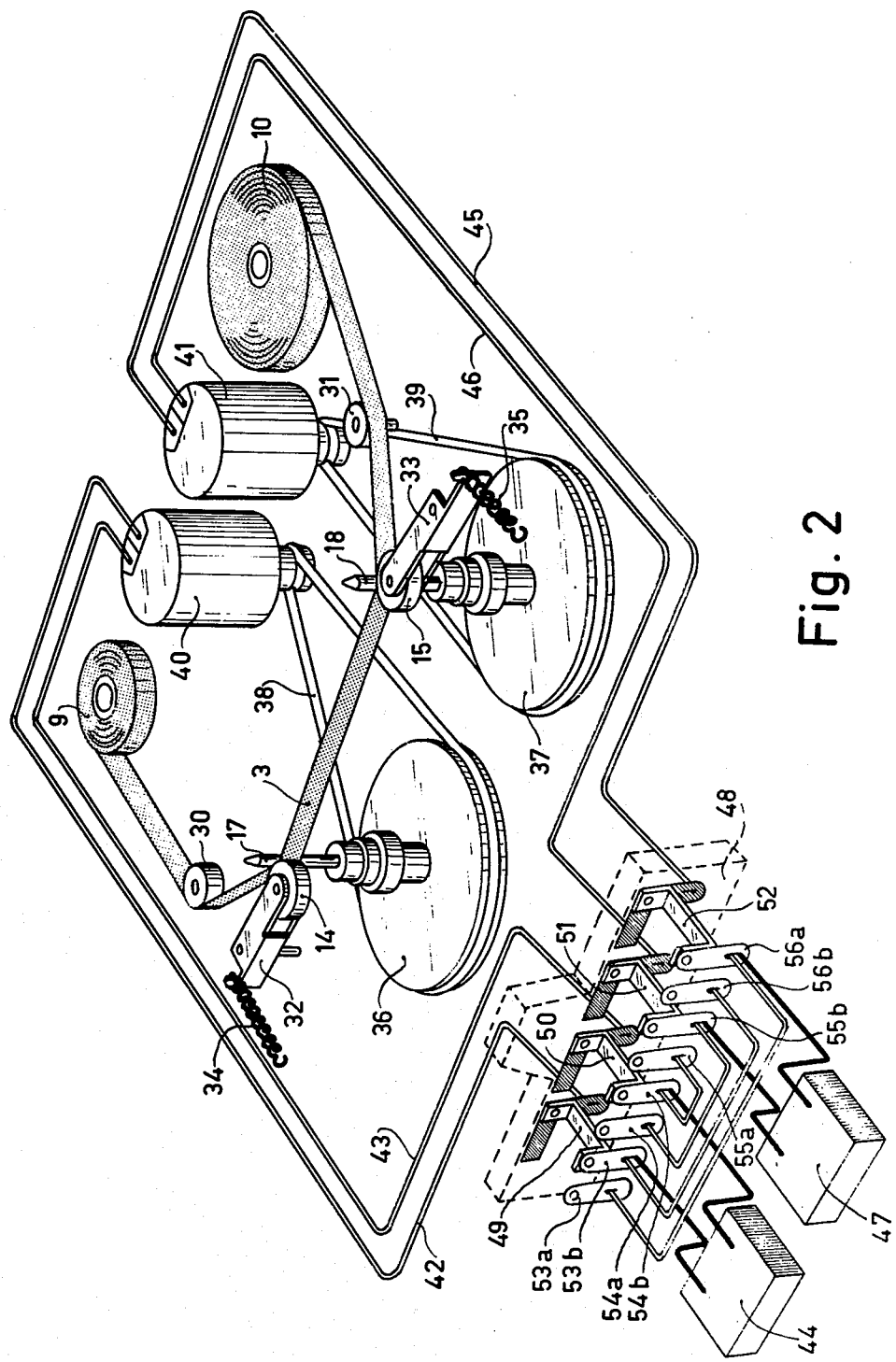

The tape transport arrangement which is shown schematically and in perspective in FIG. 2 is suitable for incorporation in a cassette recorder in accordance with FIG. 1. Therefore, the components in FIG. 2 which correspond to those in FIG. 1 bear the same reference numerals. The two pressure rollers 14 and 15 are mounted on hingeable roller levers 32 and 33, which are each loaded by means of a tension spring 24 and 35 respectively. The capstan 17 is connected to a pulley 36 which serves as a flywheel, and the capstan 18 is connected to an identical pulley 37. By means of two belts 38 and 39 the two flywheels can be driven by means of two identical electric motors 40 and 41 respectively. For driving the capstan 17 the motor 40 is connected to an electronic speed control circuit 44 by means of two electrical conductors 42 and 43, which circuit serves for maintaining the speed accurately constant. The structure of this circuit is irrelevant for the present invention, for which reason it is only represented symbolically as a block. Suitable circuit arrangements will be known from the literature to those skilled in the art. Two electrical conductors 45 and 46 connect the other motor 41 to an electronic tape tension circuit 47, which is also symbolically represented as a block. The structure of the circuit is also well known and irrelevant for the principle of this invention. The circuit merely serves to apply such a current to the electric motor 41 that during operation continuously such a driving torque is exerted on the capstan 18 (now functioning as a transport spindle) as to tend to cause this capstan to rotate with a speed 1 which is higher than the spindle speed which corresponds to the speed of transport of the magnetic tape 3. As an example, a constant current source might be used which supplies such a current to the motor that when unloaded it runs with a higher speed than when loaded. Such circuits are also well known to those skilled in the art.

For reversing the operation of the tape transport arrangement of FIG. 2 it is necessary that the motor 41 be connected to the speed control circuit 44 and the motor 49 to the tape tension circuit 47. It is obvious that this can be achieved in several ways. Purely in illustration of a possible method FIG. 2 shows a switching slide 48, which is provided with a number of contact strips 49 to 52, which can co-operate with a number of stationary contact strips 52a, b to 56a, b. In the shown position of the slide 48 the contact strips 49 to 52 cooperate with the stationary strips 53b to 56b. The switching slide 48 can be slid to the left into a position in which the contact strips 49 to 52 connected to it cooperate with the stationary contact strips 53a to 56a. In this situation the motor 41 is connected to the speed control circuit 44 and the motor 40 to the tape tension circuit 47.

It is obvious that in addition to the capstans 17 and 18 the two reels 9 and 10 must also be connected to a suitable driving device. In principle this device need not differ from the driving devices know so far for winding and rewinding the magnetic tape in cassette recorders. As this driving device is not critical to the practice of the invention, it is not shown in further detail in FIG. 2. It is apparent that for driving the reels use may be made of a driving device which is driven by one of the motors 40 or 41, or both.

Figure 3:
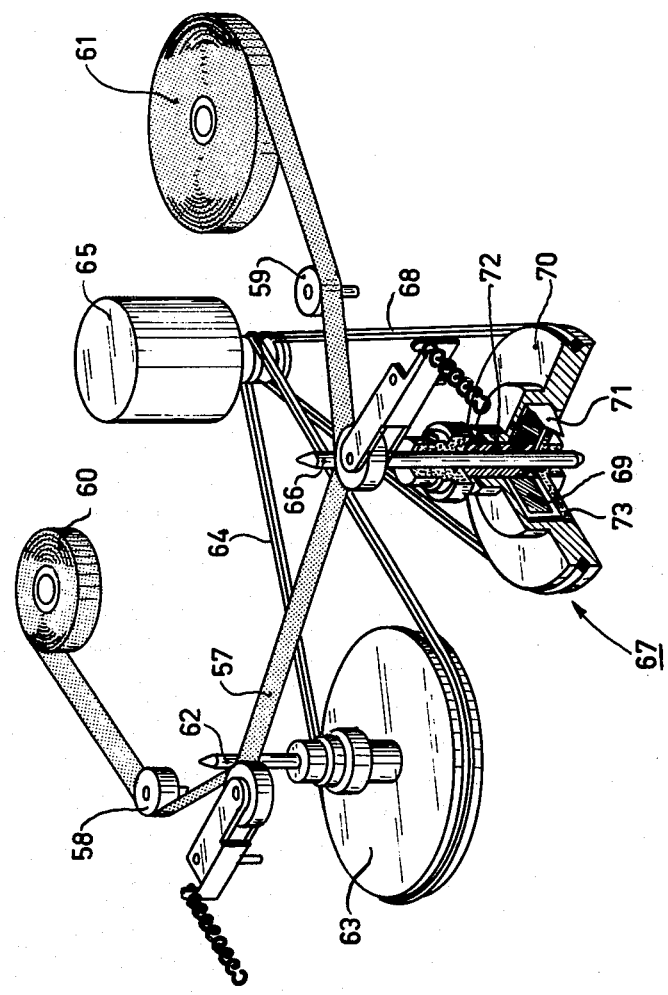
FIG. 3 shows a second embodiment of a tape transport arrangement in which the transport spindle is driven by means of a slipping clutch.

FIG. 3 shows a different embodiment of a tape transport arrangement, namely an arrangement which comprises a slipping coupling. The embodiment shown is only suitable for the transport of a magnetic tape in a single direction. The magnetic tape 57 is wound from the one reel 60 onto the other reel 61 over tape guide rollers 58 and 59. The capstan 62 is connected to a pulley 63 which serves as a flywheel, which pulley is driven by an electric motor 65 by means of a belt 64. This motor cooperates with the transport spindle 66 by means of a slip drive device which is denoted by the general reference numeral 67 through a second belt 68. The section of the slip drive device 67 which is rigidly connected to the transport spindle 66 is constituted by a magnetic disc 69 which consists of a diametrically magnetized permanent-magnetic material. The second drive section by means of which a continuous driving torque is exerted on the magnetic disc 69 during operation, which torque tends to cause the transport spindle 66 to rotate with a speed which is higher than in accordance with its operational speed, is constituted by pulley 70 which is rotatable relative to the magnetic disc, in which pulley a metal annular band 71 is mounted which fits around the magnetic disc 69 with play.

The pulley 70 is driven with a higher speed than the flywheel 63. The magnetic disc 69 is rigidly connected to the transport spindle 66 by means of a bushing 72, while the pulley 70 is journalled both on the bushing 72 and on the lower end of the transport spindle 76 by means of a bearing plate 73. As the speed of rotation of the transport spindle 66 cannot be higher (except for a possible very small slip) than that in accordance with the transport speed of the the magnetic tape 57 and is thus equal to the speed of rotation of the capstan 62, the first and the second section 69 and 70 of the slip drive device perform rotary movements with different speeds, the pulley 70 always rotating faster than the magnetic disc 69. The magnetic disc 69 together with the metal band 71 constitutes a hysteresis coupling so that continuously and without contact a driving torque is exerted on the transport spindle 64, which torque tends to cause the transport spindle to rotate with the same speed as the pulley 70. Such slipping couplings are frequently employed for driving the take-up reel in cassette recorders.

After some modification such a tape transport arrangement may also be used for reversible operation. For this purpose a number of steps will be necessary which present no problems to those skilled in the art. First of all the capstan 62 and the transport spindle 66, which in such an embodiment both may be termed capstan, should be identical and should each be provided with a drive through via a slipping coupling as shown in FIG. 3 for the transport spindle 66. The flywheels for the two capstands should have the same diameter. Furthermore, it should be possible for the two capstans to be coupled to the flywheels by means of blocking couplings which permit a relative movement in one direction between the pulley and the capstan, such as between the transport spindle 66 and the pulley 70 of the driving device of FIG. 3, but in the other driving direction constitute a fixed coupling between the pulley and the capstan. Such a blocking coupling can be incorporated in the hysteresis coupling of FIG. 3 in a simple manner in accordance with the state-of-the- art. For this purpose, one or more coupling elements, for example in the form of balls which are disposed in sloping recesses of the magnetic disc 69, may be arranged between the metal band 71 and the magnetic disc 69, which for the one direction of rotation are disposed loosely between the magnetic disc and the metal band in the other direction of rotation constitute a clamping coupling. The transmission device for transmitting the drive of the electric motor to the two capstans should comprise a device which transmits different speeds to the two flywheels, namely in such a way that in the one direction of transport the upstream capstan is driven more slowly than the downstream capstan and vice versa in the other direction of transport. It is obvious that in the first case the blocking coupling should be operative for the first capstan and the slipping coupling for the second capstan, and vice versa in the other direction of driving. Reversing the direction in which the two capstands are driven automatically results in blocking of the one coupling and releasing of the other coupling.

What is claimed is:

1. A reversible tape transport mechanism for tensioning and transporting a magnetic tape unwound from a first reel, transporting past one or more magnetic heads for operative engagement therewith, and wound onto a second reel, comprising:
   a magnetic head,
   first and second rotatable reel spindles for supporting and driving respective first and second reels on which magnetic tape extending past said head is wound,
   a rotatable capstan disposed to engage the tape between the first reel and the magnetic head, comprising a capstan spindle and a capstan first drive section connected to and rotating with the capstan spindle,
   a capstan pressure roller for pressing the magnetic tape against the capstan,
   a transport spindle disposed to engage the tape between the magnetic head and the second reel, said transport spindle including a spindle section and transport first drive section identical to said capstan spindle and capstan first drive section respectively, said transport drive section being connected to and rotating with said spindle section,
   a transport spindle pressure roller for pressing the magnetic tape against the transport spindle, and
   drive means for rotating at least the second reel spindle, the capstan, and the transport spindle; said drive means including means for driving the capstan at a controlled speed for accurately determining the speed of the magnetic tape past the magnetic head, and means for driving the transport spindle with a controlled torque tending to rotate the transport spindle at a speed higher than a speed corresponding to the tape speed past the magnetic head; said means for driving the capstan and means for driving the transport spindle each including a respective identical electric motor and means for mechanically connecting the respective motor to the respective first drive section to rotate each said drive section at a speed having a fixed ratio to the respective motor speed,
   (a) said means for driving the capstan further including an electronic speed control circuit for maintaining the speed accurately constant,
   (b) said means for driving the transport spindle further including an electronic tape tension circuit for applying such a supply current to the motor that the torque required for the tape tension is produced, and (c) the drive means further including means for switching electrical connection of the speed control circuit and the tape tension circuit from the one motor to the other motor respectively whereby tape tension and speed past the head are controlled identically for operation in the reverse direction.

2. A reversible tape transport mechanism for tensioning and transporting a magnetic tape unwound from a first reel, transported past one or more magnetic heads for operative engagement therewith, and wound onto a second reel, comprising:

a magnetic head, first and second rotatable reel spindles for supporting and driving respective first and second reels on which magnetic tape extending past said head is wound, a rotatable capstan disposed to engage the tape between the first reel and the magnetic head, comprising a capstan spindle, a capstan first drive section mechanically connected to and rotating with the capstan spindle, and a second drive section, a capstan pressure roller for pressing the magnetic tape against the capstan, a transport spindle disposed to engage the tape between the magnetic head and the second reel, comprising a spindle section, a transport first drive section mechanically connected to and rotating with said spindle section, and a transport second drive section; said spindle section, transport first drive section and transport second drive section being identical with the respective capstan spindle, first and second drive sections, a transport spindle pressure roller for pressing the magnetic tape against the transport spindle, and drive means for rotating at least the second reel spindle, the capstan, and the transport spindle; said drive means including means for driving the capstan at a controlled speed for accurately determining the speed of the magnetic tape past the magnetic head, and means for driving the transport spindle with a controlled torque tending to rotate the transport spindle at a speed higher than a speed corresponding to the tape speed past the magnetic head, (a) said means for driving the transport spindle comprising two slipping couplings, each connecting between the second drive section and the first drive section of a respective one of the identical spindles, (b) said means for driving the capstan comprising two blocking couplings each connecting a second drive section to a respective first drive section, and (c) said drive means further including a tape transport motor and a transmission device for transmitting the rotation of the motor with different speeds to said spindles, and a switching device for changing the direction of driving of the spindles and simultaneously interchanging the difference in speed between the two spindles.

3. A reversible tape transport mechanism for tensioning and transporting a magnetic tape unwound from a first reel, transported past one or more magnetic heads for operative engagement therewith, and wound onto a second reel, comprising:

a magnetic head, first and second rotatable reel spindles for supporting and driving respective first and second reels on which magnetic tape extending past said head is wound, a rotatable capstan disposed to engage the tape between the first reel and the magnetic head, a capstan pressure roller for pressing the magnetic tape against the capstan, a transport spindle disposed to engage the tape between the magnetic head and the second reel, a transport spindle pressure roller for pressing the magnetic tape against the transport spindle, and drive means for rotating at least the second reel spindle, the capstan, and the transport spindle; said drive means including means for driving the capstan at a controlled speed for accurately determining the speed of the magnetic tape past the magnetic head, and means for driving the transport spindle with a controlled torque extending to rotate the transport spindle at a speed higher than a speed corresponding to the tape speed past the magnetic head; said means for driving the transport spindle including a first device section connected to and rotatable with the transport spindle, a second drive section, means for driving the second drive section at a speed greater than the controlled speed of the capstan, and a slipping clutch connecting said second drive section to said first drive section; and said means for driving the capstan comprising a third drive section connected to and rotatable with the capstan, a drive motor having a drive pulley, and a belt connecting said pulley to said third drive section.

* * * * *

UNITED STATES PATENT AND TRADEMARK OFFICE
CERTIFICATE OF CORRECTION

PATENT NO. : 4,152,735
DATED : May 1, 1979
INVENTOR(S) : JOHANNES J.M. SCHOENMAKERS

It is certified that error appears in the above-identified patent and that said Letters Patent are hereby corrected as shown below:

Col. 8, line 22, change "transporting" to --transported--
Col. 10, line 38, change "extending" to --tending--
line 42, change "device" to --drive--

Signed and Sealed this

Fourteenth Day of August 1979

[SEAL]

Attest:

LUTRELLE F. PARKER

*Attesting Officer*   *Acting Commissioner of Patents and Trademarks*